No. 777,963. PATENTED DEC. 20, 1904.
E. LINK.
WEEDER.
APPLICATION FILED JUNE 16, 1904.
NO MODEL.
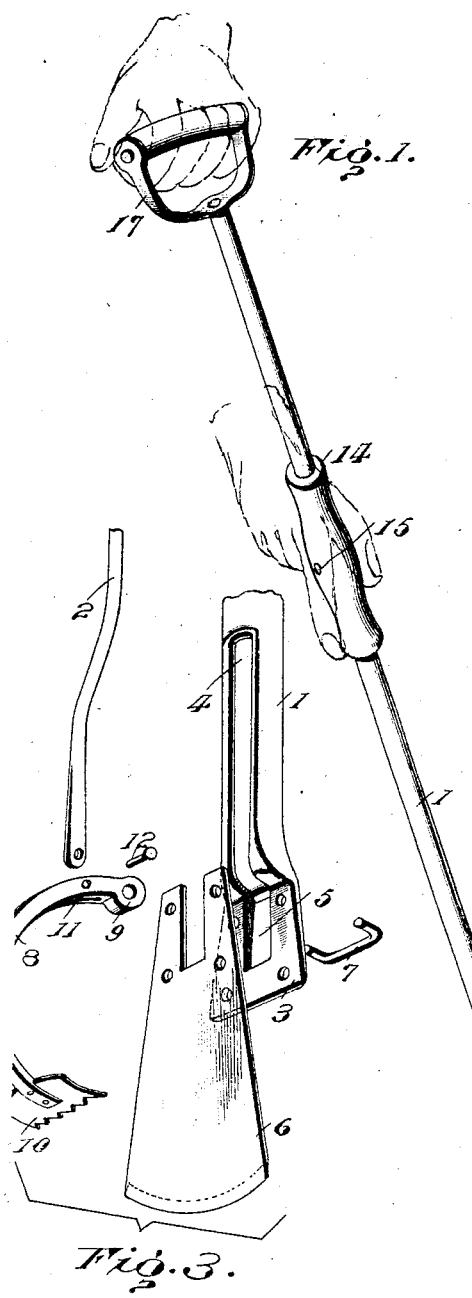
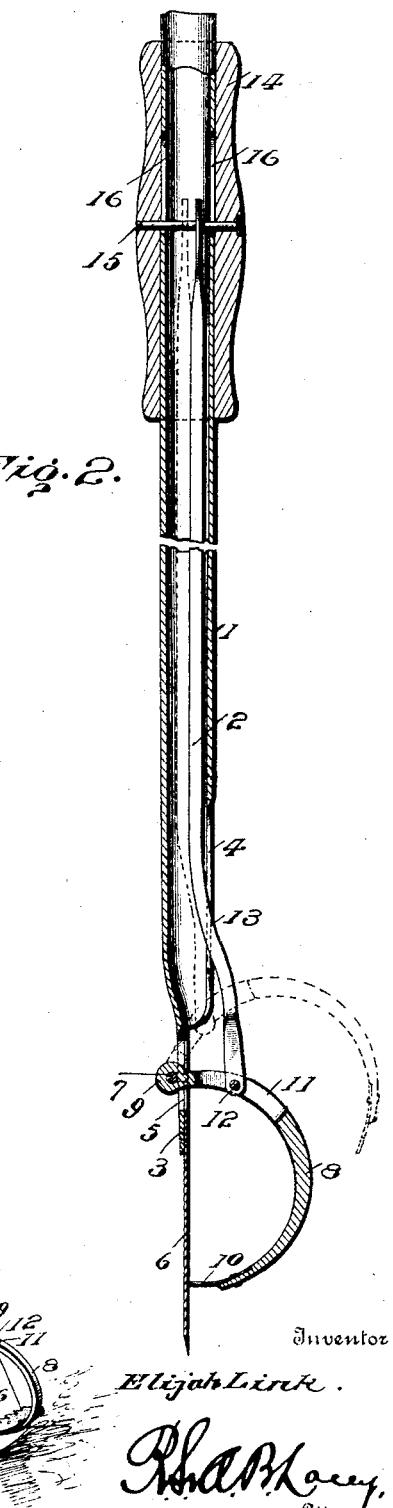
Inventor
Elijah Link.
Witnesses No. 777,963.　　　　　　　　　　　　　　　　　　　　Patented December 20, 1904.

UNITED STATES PATENT OFFICE.

ELIJAH LINK, OF PIQUA, OHIO.

WEEDER.

SPECIFICATION forming part of Letters Patent No. 777,963, dated December 20, 1904.

Application filed June 16, 1904. Serial No. 212,807.

*To all whom it may concern:*

Be it known that I, ELIJAH LINK, a citizen of the United States, residing at Piqua, in the county of Miami and State of Ohio, have invented certain new and useful Improvements in Weeders, of which the following is a specification.

This invention has for its object to devise an implement for eradicating weeds and other objectionable growths and which will obviate the necessity of the person bending or stooping.

The implement comprises a scuffle-blade for penetrating the earth and loosening the weed, a gripper for taking hold of the weed and acting jointly with the scuffle-blade for holding the weed firmly, and novel operating means and connections for the working parts, all of which will be set forth more fully hereinafter and illustrated in the accompanying drawings, in which—

Figure 1 is a perspective view of an implement embodying the invention. Fig. 2 is a longitudinal section of an end portion of the implement on a larger scale. Fig. 3 is a detail perspective view of the scuffle-blade, gripper, lower portion of the handle and operating-rod, and the connecting means, the several parts being separated and arranged in a group.

Corresponding and like parts are referred to in the following description and indicated in all the views of the drawings by the same reference characters.

The handle 1 may be of any determinate length and is preferably tubular, so as to inclose and house the operating-rod 2. The lower end of the handle is flattened, as shown at 3, and slotted, as indicated at 4 and 5, the slot 5 being in the flattened portion 3 and the slot 4 in the end portion of the handle adjacent to the flattened part 3, the two slots 4 and 5 being in longitudinal alinement. The scuffle-blade 6 is riveted or otherwise firmly attached to the flattened end 3 of the handle, and its upper end is cut away to correspond to the slot 5 to admit of the pivotal end of the gripper passing through said slot. A staple 7 is applied to the upper portion of the flattened end 3 and serves as securing means between the parts 3 and 6 and at the same time provides a fulcrum-support for the gripper.

The gripper comprises a curved arm 8, having a sleeve 9 at one end and provided at its opposite end with a blade 10, preferably riveted thereto, and having its lower edge toothed, so as to make positive engagement with the weed or other growth to be extirpated. The end portion of the arm 8 having the sleeve 9 is passed through the slot 5, and the horizontal portion of the staple 7 is received within said sleeve and pivotally connects the gripper to the handle. The lower end of the operating-rod 2 is inserted in a slot 11, formed in the upper end of the arm 8, and is pivoted thereto by means of the pin 12, which is passed through corresponding openings of the parts 2 and 8. The lower portion of the operating-rod is curved, as indicated at 13, and passes through the slot 4. The upper portion of the operating-rod is connected to a slide 14, mounted upon the handle 1, to receive a reciprocating movement, said slide being connected to the operating-rod by means of a pin or like fastening 15, the end portions of which pass through longitudinal slots 16, formed in opposite sides of the handle.

A suitable grip or handpiece 17 is applied to the upper end of the handle 1 to enable a firm hold being taken of the implement when the same is in operation. The part 17 is grasped in one hand and the slide 14 is gripped in the other hand and moved upward upon the handle, so as to carry the lower portion of the gripper away from the scuffle-blade 6, as indicated by the dotted lines in Fig. 2, after which the blade 6 is pressed into the ground alongside of the root of the weed or other growth to be extracted. After the blade 6 has been pressed into the ground the proper distance the handle is manipulated so as to loosen the weed and the slide 14 is moved downward to cause the gripper to close upon the weed and clamp the latter between the blades 6 and 10, after which an upward pull upon the implement will remove the weed, root and all.

Having thus described the invention, what is claimed as new is—

1. In a weeding implement, the combination of a handle provided at its lower end with a scuffle-blade and having a slot at the upper end of said blade, a gripper adapted to coöperate with the scuffle-blade and comprising a curved arm and having its upper end passed through the slot at the upper end of the scuffle-blade and pivoted to the handle at the side of said blade opposite to that facing the gripper, a slide mounted upon the handle, and an operating-rod connecting said slide with the curved arm of the gripper, substantially as described.

2. In a weeding implement, the combination of a tubular handle having its lower end flattened and longitudinally slotted, a scuffle-blade at the lower end of the handle, a gripper pivotally connected to the handle and adapted to coöperate with the scuffle-blade, a slide mounted upon the handle, and an operating-rod connecting said slide with the gripper, substantially as specified.

3. In a weeding implement, the combination of a handle provided at its lower end with a scuffle-blade and having a longitudinal slot, a fastening connecting the scuffle-blade to the handle, a gripper for coöperating with the scuffle-blade and pivotally mounted upon the said fastener, an operating-rod, and a slide mounted upon the handle and having the operating-rod connected thereto, substantially as set forth.

4. The herein-described weeding implement comprising a tubular handle having a hand-piece at its upper end and its lower end flattened and longitudinally slotted, a scuffle-blade secured to the flattened end of the handle, a gripper comprising a curved arm and blade, means for pivotally connecting the gripper to the handle, an operating-rod, a slide mounted upon the handle, and connecting means between said slide and operating-rod, substantially as set forth.

In testimony whereof I affix my signature in presence of two witnesses.

ELIJAH LINK. [L. S.]

Witnesses:
C. B. JAMISON,
S. B. PICKERING.